United States Patent [19]

Ward

[11] 4,181,359

[45] Jan. 1, 1980

[54] SEAT BELT ANCHORAGE ASSEMBLIES

[76] Inventor: Andrew L. Ward, 15 Douglas Rd., Standish, Wigan, Lancashire WN6 0QT, England

[21] Appl. No.: 848,353

[22] Filed: Nov. 3, 1977

[30] Foreign Application Priority Data

Nov. 4, 1976 [GB] United Kingdom ............... 45963/76

[51] Int. Cl.² .................... A62B 35/00; A44C 5/18
[52] U.S. Cl. ........................... 297/468; 24/265 AL
[58] Field of Search ............... 24/265 AL; 297/389, 297/385, 387; 16/DIG. 6; 85/5 B, DIG. 3; 280/744; 151/9; 248/204, 145

[56] References Cited

U.S. PATENT DOCUMENTS

| | | | |
|---|---|---|---|
| 447,697 | 3/1891 | Pollard | 151/9 |
| 666,065 | 1/1901 | Oliver | 151/9 |
| 2,616,649 | 11/1952 | Grosse | 248/145 X |
| 2,960,741 | 3/1960 | Bruno | 85/5 B |
| 3,877,114 | 4/1975 | Silen | 297/389 X |

FOREIGN PATENT DOCUMENTS

| | | | |
|---|---|---|---|
| 2520111 | 11/1976 | Fed. Rep. of Germany | 297/389 |
| 2539359 | 10/1977 | Fed. Rep. of Germany | 297/389 |
| 1030364 | 5/1966 | United Kingdom | 297/385 |
| 1104245 | 2/1968 | United Kingdom . | |
| 1252733 | 11/1971 | United Kingdom . | |
| 1486974 | 9/1977 | United Kingdom | 297/387 |

*Primary Examiner*—James T. McCall
*Attorney, Agent, or Firm*—Young & Thompson

[57] ABSTRACT

A seat belt anchorage assembly comprises a headed bolt with plain and outer screw-threaded shank portions extending from a face of the head, and a bracket having an aperture through which the plain shank portion of the bolt rotatably extends and a slot for receiving a seat belt, a spring being engaged on the shank and abutting the bracket to urge the bracket against the head, the spring serving initially to hold the assembly together and as an anti-rattle spring after installation in a vehicle.

1 Claim, 4 Drawing Figures

SEAT BELT ANCHORAGE ASSEMBLIES

The invention relates to seat belt anchorage assemblies.

In the installation of a seat belt system in a motor vehicle, it is necessary to secure at appropriate positions in the vehicle, anchorage assemblies including brackets to which one end of the seat belt is or can be attached, or which mount a running loop through which the belt can extend. Such brackets are conveniently provided with an aperture so that they can be secured within a tapped hole in a door pillar or sill, for example, by means of a headed bolt. Before installation, it is convenient to have the bracket held in place on the bolt shank, and in use it is desirable that the bracket be biased against the inside face of the bolt head.

The bracket is thereby correctly positioned in relation to the rest of the seat belt system and it is also prevented from rattling on the bolt shank in use.

The present invention has as its object the provision of a seat belt anchorage assembly in which these requirements are met in a particularly simple way.

According to the invention, a seat belt anchorage assembly comprising a headed bolt having a shank extending through an aperture in a seat belt bracket, and a spring means acting between the shank and the bracket to urge the bracket towards the head of the bolt.

The invention thus employs a spring in the dual function of an anti-rattle spring and as a means for holding the components of the assembly together. An anchorage assembly embodying the invention can thus consist of only three elements, the bolt, the bracket, and the spring, which once assembled, are held securely together during storage and transport so as to be ready for convenient installation when required. The assembly can be part of, or designed for use with, a seat belt system of any appropriate kind.

By way of illustration, preferred anchorage assemblies embodying the invention are described below and illustrated in the accompanying drawing, in which.

Figure 1:
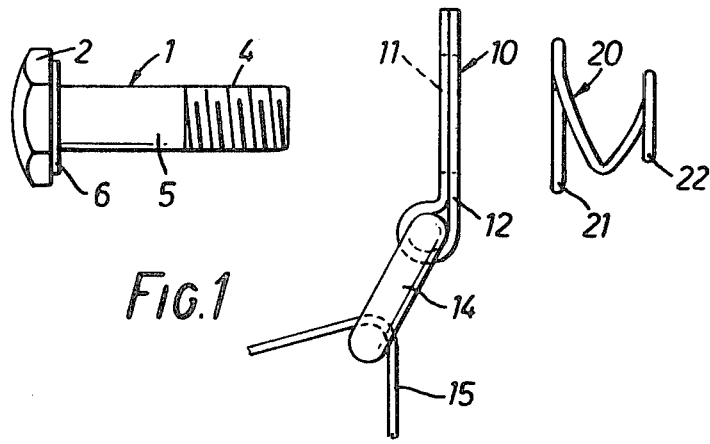
FIG. 1 is a side view of a first such seat belt anchorage assembly, the components thereof being shown spaced apart.
Figure 2:
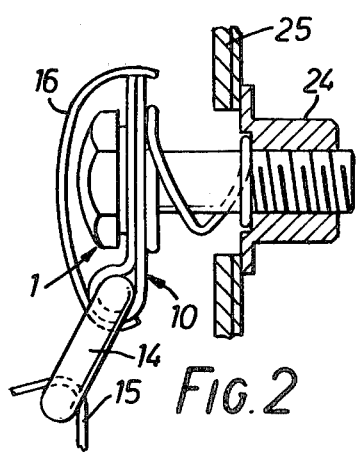
FIG. 2 is a part sectional side view of the assembly of FIG. 1 installed in a vehicle door pillar.

The anchorage assembly illustrated in FIGS. 1 and 2 comprises a bolt 1 having a head 2 and a shank with a screw threaded free end portion 4, and a plain shank portion 5 between the screw threaded portion and the head. The head 2 is provided with flat side surfaces to facilitate rotation of the bolt during installation of the assembly and its face adjacent the shank portion 5 is preferably provided with a shoulder 6 as shown for engagement with a seat belt bracket 10 having an aperture 11 through which the bolt shank extends.

Figure 3:
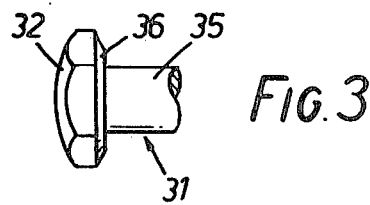
FIG. 3 is a partial side view of one component of a second such anchorage assembly.

The illustrated bracket 10 comprises a plate 12 doubled around one longer side of an elongated loop 14 of thick wire, the overlapping plate portions being provided with the aperture 11. The loop 14 is secured to the plate 12 so that its other longer side is spaced beyond the head 2 when assembled on the bolt 1, as shown in FIG. 3. The loop 14 thus constitutes a running loop through which a seat belt 15 can extend. As also shown in FIG. 2, a plastics cover 16 can be snapped on to the bracket 10 after installation to cover the bolt head 2.

The third and only other element of the anchorage assembly of FIGS. 1 and 2 is a spring 20 which may have the frustoconical form shown. The spring 20 comprises a length of wire, for example galvanised wire, extending between larger and smaller diameter part-circular end portions 21, 22. After assembly with the bracket 10 and the bolt 1 the larger end portion 21 is resiliently urged to abut against the rear face of the bracket by engagement of the smaller end portion 22 on the shank of the bolt conveniently at the inner end of the threaded portion 4.

It will be appreciated that the anchorage assembly can be readily stored and handled, before installation in a vehicle, and is very simply inserted in a nut 24 as shown, or in a pre-prepared tapped hole in a door pillar 25 of the vehicle simply by rotation of the bolt 1. The bracket 10 turns freely on the bolt shank portion 5 against its frictional engagement with the head 2 and the spring 20, and can so be made to occupy its required position. The bolt 1 is screwed home until the screwthread runs out and jams in the receiving nut 24. The length of the plain shank portion 5 is selected to suit trim thickness and tolerances in this thickness are accommodated by compression of the spring 20.

Figure 4:
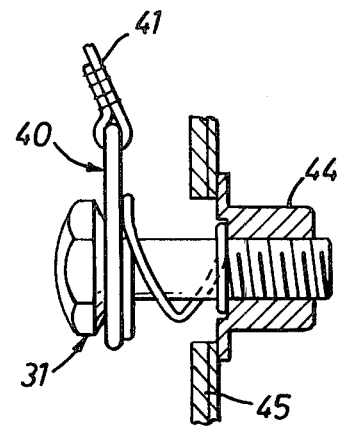
FIG. 4 is view resembling that of FIG. 2 but showing the second anchorage assembly installed in a vehicle door sill.

In the assembly shown in FIGS. 3 and 4, the face of the head 32 of a bolt 31 adjacent its plain shank portion 35 is provided with a shallow taper at 36 instead of the shoulder 6 but otherwise resembles the bolt 1 of FIGS. 1 and 2. Instead of the taper at 36, there may be provided a convex shape of large radius, the function of which, like that of the taper and the shoulder 6 is to centre the bolt within the bracket aperture. In FIGS. 3 and 4, a bracket 40 has the form of a generally triangular plate with an elongated slot extending tangentially of the bolt through which one end of a seat belt 41 is lead to be secured to itself by stitching for example. The edge of the slot engaged by the seat belt may be lined by a material which limits wear by abrasion of the material of the belt. The assembly is completed by a spring identical to the spring 20 of FIG. 1.

As shown in FIG. 4, the assembly is installed in a receiving nut 44 secured at an aperture in a vehicle door sill 45, the bracket 40 being turned on the shank portion 35 so that the belt 41 extends upwardly.

The present invention thus provides a very simple and convenient anchorage assembly, and can of course be modified in a variety of ways from the embodiments specifically described without departing from the scope of the invention as defined by the following claims.

I claim:
1. A seat belt anchorage assembly comprising:
a screw-threaded bolt,
said bolt having a head and a shank,
bracket means,
said bracket means having a plate portion, an aperture in said plate portion through which the shank of the bolt extends, whereby the bracket means is rotatably carried on the bolt, and means for receiving a seat belt, and
spring means comprising a frusto-conical helical spring surrounding said shank and having the larger end thereof abutting said plate portion around said aperture, and the smaller end thereof in gripping engagement with said shank to hold the components of the assembly together.

* * * * *